No. 801,211. PATENTED OCT. 10, 1905.
W. BÜTZOW.
OIL SEPARATOR.
APPLICATION FILED DEC. 11, 1903.

WITNESSES:
Paul Lange
INVENTOR:
Wilhelm Bützow

UNITED STATES PATENT OFFICE.

WILHELM BÜTZOW, OF DÜSSELDORF, GERMANY.

OIL-SEPARATOR.

No. 801,211.        Specification of Letters Patent.        Patented Oct. 10, 1905.

Application filed December 11, 1903. Serial No. 184,766.

*To all whom it may concern:*

Be it known that I, WILHELM BÜTZOW, a resident of Düsseldorf, in the Kingdom of Prussia, German Empire, have invented new and useful Improvements in Oil-Separators for Steam, of which the following is a specification.

The present oil-separator belongs to that kind of devices in which steam holding oil is conveyed into a receptacle provided with plates, bars, troughs, or the like, which are adapted to separate the oil from the steam-current. In all hitherto-known arrangements of this kind the separation of the oil has to take place within the steam-receptacle and steam-current, there being no special devices to support the instantaneous separation of the oil from the steam-current and to lead the separated oil away. The oil and oil-water therefore always remain more or less within the steam-current, and the latter draws the same again with it, so that the effect of this apparatus is actually quite imperfect. The present oil-separator differs from all these well-known apparatus so far as there is a special accumulator or receptacle arranged in the steam-drum. The oil or oil-water, respectively, on being separated from the steam by specially-formed separating devices, as plates, bars, or troughs arranged within the steam-drum, is immediately and some way positively conveyed into said oil-receptacle, and thus out of the course of the steam-current, whereby a perfect separation of it from the steam is insured.

The invention is illustrated in the accompanying drawings, in which similar letters denote similar parts.

Figure 1:
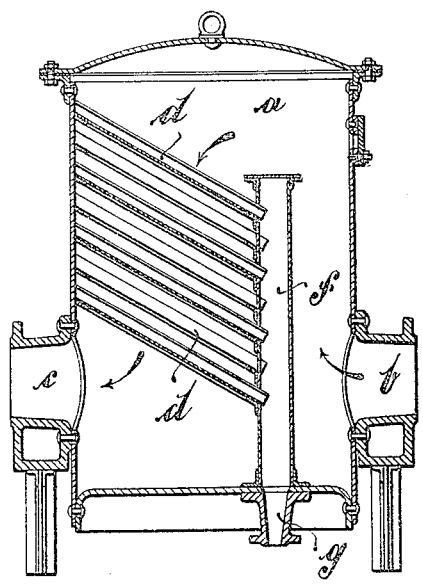
Figure 2:
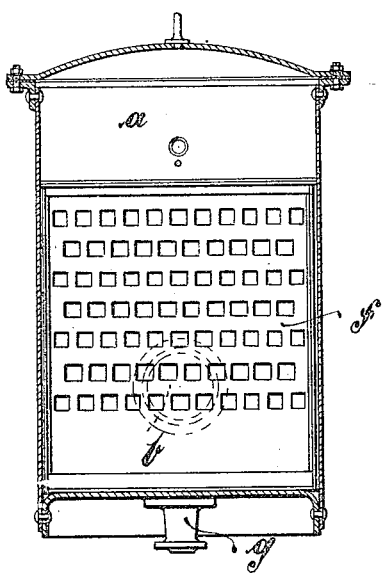
Figure 3:
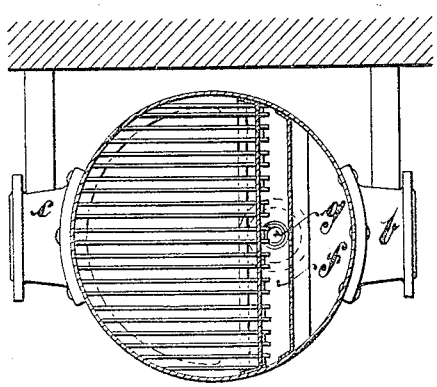
Figure 4:
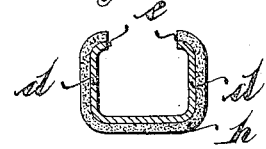
Figure 5:
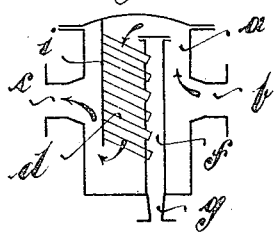

Figure 1 shows a vertical section of the steam-drum with the oil-separator arranged therein. Fig. 2 is also a vertical section showing the arrangement of the troughs within the steam-drum. Fig. 3 is a cross-section of the steam-drum. Fig. 4 is a detail part, showing a cross-section through the trough; and Fig. 5 is a scheme of my new oil-separator, showing the way of the steam passing through.

$a$ is a steam-drum, having an inlet $b$ and an outlet $c$. The oil-separator may, as stated above, consist of plates, bars, or preferably, as shown, of U-shaped troughs $d$, the top edges $e$ of which are bent over, as shown in Fig. 4. These troughs are arranged at the side of each other in rows and alternatively one above the other, Figs. 1 and 2, and are on one end applied to the wall of the drum or to an intermediate piece arranged within the drum and on their other end terminate into receptacle $f$. This receptacle $f$ is entirely closed from all sides and on its bottom it has an opening which registers with an outlet $g$, arranged in the bottom of the drum.

It is obvious that the steam holding oil when entering the drum through $b$ and flowing over the troughs will be deprived of the oil, and the oil or oil-water gathering in the troughs will immediately flow along these troughs into the receptacle $f$, wherefrom it may then be discharged through the outlet $g$.

It has been found advantageous to cover the troughs on their outside with felt $h$, as seen from Fig. 4, and to arrange a partition-wall $i$, Fig. 1, within the oil-receptacle $f$.

Owing to the fact that in the present arrangement all troughs have their open side turned toward the steam-current and are alternatively arranged underneath each other and terminate into a mutual oil-receptacle into that the exhaust-steam cannot pass, owing to the vacuum of the condensation, the steam will become perfectly separated from the oil.

Having now particularly described and ascertained the nature of my invention and in what manner the same is to be performed, I declare that what I claim is—

In an oil-separator for steam the combination of troughs arranged in series at the side of each other and alternatively one above the other within said drum, one end of said troughs being suitably attached to a partition-wall and the other to the wall of an oil-receptacle entirely closed from all sides and provided on its bottom with an opening which registers with an outlet in the drum-bottom, the troughs all terminating into that receptacle, substantially as described and shown and for the purpose set forth.

In testimony whereof I have hereunto set my hand in presence of two witnesses.

WILHELM BÜTZOW.

Witnesses:
     WILLIAM ESSENWEIN,
     PETER LIEBER.